US012780026B2

(12) United States Patent
Cheng et al.

(10) Patent No.: US 12,780,026 B2
(45) Date of Patent: Nov. 3, 2026

(54) MOBILE CHARGING DEVICE AND CHARGING METHOD THEREOF

(71) Applicant: DARWIN PRECISIONS CORPORATION, Hsinchu County (TW)

(72) Inventors: Chih-Ying Cheng, Hsinchu County (TW); Chi-Fu Chang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 638 days.

(21) Appl. No.: 18/240,354

(22) Filed: Aug. 31, 2023

(65) Prior Publication Data

US 2024/0294085 A1 Sep. 5, 2024

(30) Foreign Application Priority Data

Mar. 2, 2023 (TW) ................................ 112107549

(51) Int. Cl.

*B60L 53/14* (2019.01)
*B60L 53/16* (2019.01)
*B60L 53/36* (2019.01)
*E04H 6/34* (2006.01)
*H02J 7/70* (2026.01)

(52) U.S. Cl.

CPC ............... *B60L 53/36* (2019.02); *B60L 53/16* (2019.02); *E04H 6/34* (2013.01); *H02J 7/751* (2026.01)

(58) Field of Classification Search

CPC .......... B60L 53/36; B60L 53/16; B60L 53/14; B60L 53/30; B60L 53/35; E04H 6/34; H02J 7/751; H02J 7/00; Y02T 10/70; Y02T 10/7072

See application file for complete search history.

(56) References Cited

U.S. PATENT DOCUMENTS

2011/0140658 A1 6/2011 Outwater et al.
2020/0353833 A1* 11/2020 Kim ........................ B60L 53/14

(Continued)

FOREIGN PATENT DOCUMENTS

CN 208934502 U 6/2019
CN 211335598 U 8/2020
CN 113668925 A 11/2021

(Continued)

*Primary Examiner* — Jamara A Franklin

(57) ABSTRACT

A mobile charging device includes a charging host, two charging plates, a mobile parking plate and a charging gun. The charging host includes two electrode blocks having different electrical properties. The two charging plates are in contact with the two electrode blocks, respectively. The mobile parking plate includes a parking plate body having a first surface and a second surface, and two conductive contact blocks disposed on the second surface, wherein the first surface is adapted to park the vehicle. The charging gun is disposed on the parking plate body and electrically connected with two conductive contact blocks. When the mobile parking plate is in the first position, the charging gun, the two conductive contact blocks, the two charging plates and the charging host are conducted with each other, and the vehicle parked on the parking plate body can be charged through the charging gun.

8 Claims, 4 Drawing Sheets

(56) References Cited

U.S. PATENT DOCUMENTS

| | | | | |
|---|---|---|---|---|
| 2022/0289056 | A1* | 9/2022 | Saita | B60L 53/62 |
| 2022/0363154 | A1* | 11/2022 | Hu | B60L 58/26 |

FOREIGN PATENT DOCUMENTS

| | | | |
|---|---|---|---|
| JP | 2021085277 | A | 6/2021 |
| TW | M617037 | U | 9/2021 |
| TW | I751930 | B | 1/2022 |
| TW | M625833 | U | 4/2022 |
| TW | M633167 | U | 10/2022 |

* cited by examiner

MOBILE CHARGING DEVICE AND CHARGING METHOD THEREOF

FIELD OF THE INVENTION

The present invention relates to the field of automobile charging, and more particularly to a mobile charging device and a charging method thereof with good use efficiency.

BACKGROUND OF THE INVENTION

With the increasing awareness of environmental protection and energy saving among modern people, electric vehicles or oil-electric vehicles have become the priority choice for the new generation of people to choose as a means of transportation. Due to the large number of electric vehicles or oil-electric vehicles from various vehicle manufacturers entering the market, and the increasingly affordable sales prices, the electric vehicles or oil-electric vehicles are becoming increasingly popular in the market, thus making the shortage of charging devices increasingly obvious. Therefore, the convenience of setting up and using the charging device has become an urgent problem to be solved.

Currently, the existing automobile charging device is arranged at the rear of a planar parking zone, and the electric vehicle or oil-electric vehicle can only be parked and charged in a single manner in cooperation with a provided charging hole. A user must calculate charging completion time by himself so as to come and pick up the vehicle, otherwise, other vehicles will be unable to be charged. In another aspect, the city is densely populated, and there are more and more mechanical parking spaces or multistory parking garages. However, currently, most mechanical parking spaces or multistory parking garages are suitable for traditional gasoline or diesel engine vehicles, and there is a lack of charging devices for the electric vehicles or oil-electric vehicles. Therefore, building an automatic automobile charging device can greatly shorten the waiting time for users to queue up for charging, and also improve the use efficiency of the automatic automobile charging device.

SUMMARY OF THE INVENTION

The present invention provides a mobile charging device which is adapted to charge vehicles such as an electric vehicle and an oil-electric vehicle, and is combined with equipment of an existing mechanical parking space or multistory parking garage to build an automatic automobile charging device, to achieve the objectives of shortening waiting time for charging and improving the use efficiency of the charging device.

The present invention provides a mobile charging device, including a charging host, two charging plates, a mobile parking plate and a charging gun. The charging host is adapted to provide electricity and includes a first electrode block and a second electrode block, and the first electrode block and the second electrode block have different electrical properties. The two charging plates correspond to and are in contact with the first electrode block and the second electrode block, respectively. The mobile parking plate includes a parking plate body and two conductive contact blocks, wherein the parking plate body has a first surface and a second surface that are opposite, the first surface is adapted to park a vehicle, and the two conductive contact blocks are disposed on the second surface. The charging gun is disposed on the parking plate body and electrically connected with two conductive contact blocks. The mobile parking plate is adapted to move relative to the charging host to be in one of the first position and the second position. When the vehicle is in the first position, the two conductive contact blocks are in contact with the two charging plates, respectively, so that the charging gun, the conductive contact blocks, the charging plates and the charging host are conducted with each other, and the electricity provided by the charging host is adapted to charge the vehicle parked on the parking plate body through the charging gun; and when the mobile parking plate is in the second position, the two conductive contact blocks get far away from the two charging plates, respectively.

The present invention provides a charging method, including: providing the mobile charging device; driving a vehicle onto a first surface of a parking plate body of the mobile charging device; controlling a mobile parking plate with the vehicle parked to move to a first position, so that two conductive contact blocks of the mobile parking plate are in contact with two charging plates, respectively, the charging gun, the conductive contact blocks, the charging plates and the charging host are conducted with each other, and the electricity provided by the charging host charges the vehicle parked on the parking plate body through the charging gun; and when the charging of the vehicle is completed, controlling the mobile parking plate to move away from the first position.

The present invention adopts the movable characteristic of the mobile parking plate, so that the conductive contact blocks may be moved to be in contact with the charging plates to form a conductive circuit loop, and the electricity provided by the charging host can charge the vehicle parked on the mobile parking plate through the charging gun on the mobile parking plate; when the charging of the vehicle is completed, the mobile parking plate and the charged vehicle may be moved away from the charging plates with the help of the movement of the mobile parking plate, so that another vehicle parked on another mobile parking plate and waiting for charging may be moved to the charging plates with the help of mobile parking plate on which the another vehicle is parked, and the charging gun on the mobile parking plate on which the another vehicle is parked is allowed to be in a power-on state to charge the vehicle. The mobile charging device and the charging method can greatly shorten the waiting time for users to queue up for charging, and also improve the use efficiency of the automatic automobile charging device.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
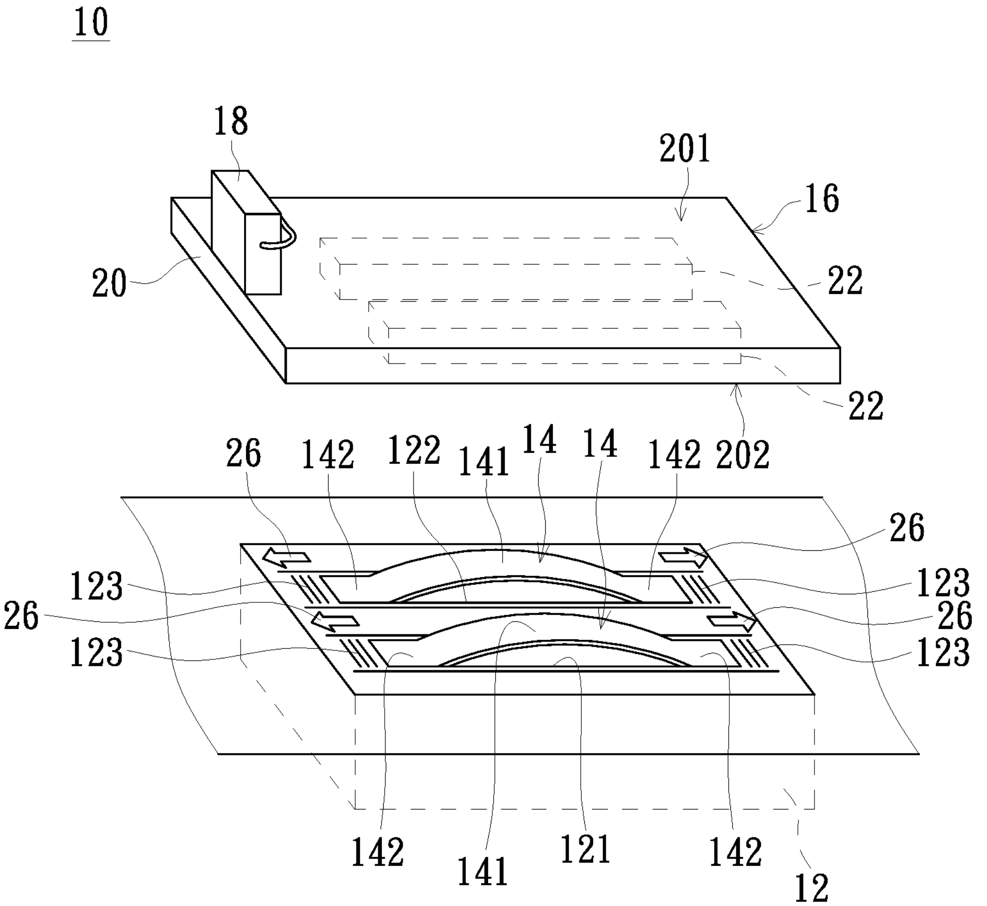
FIG. 1 is a schematic perspective view of a mobile charging device according to an embodiment of the present invention.
Figure 2:
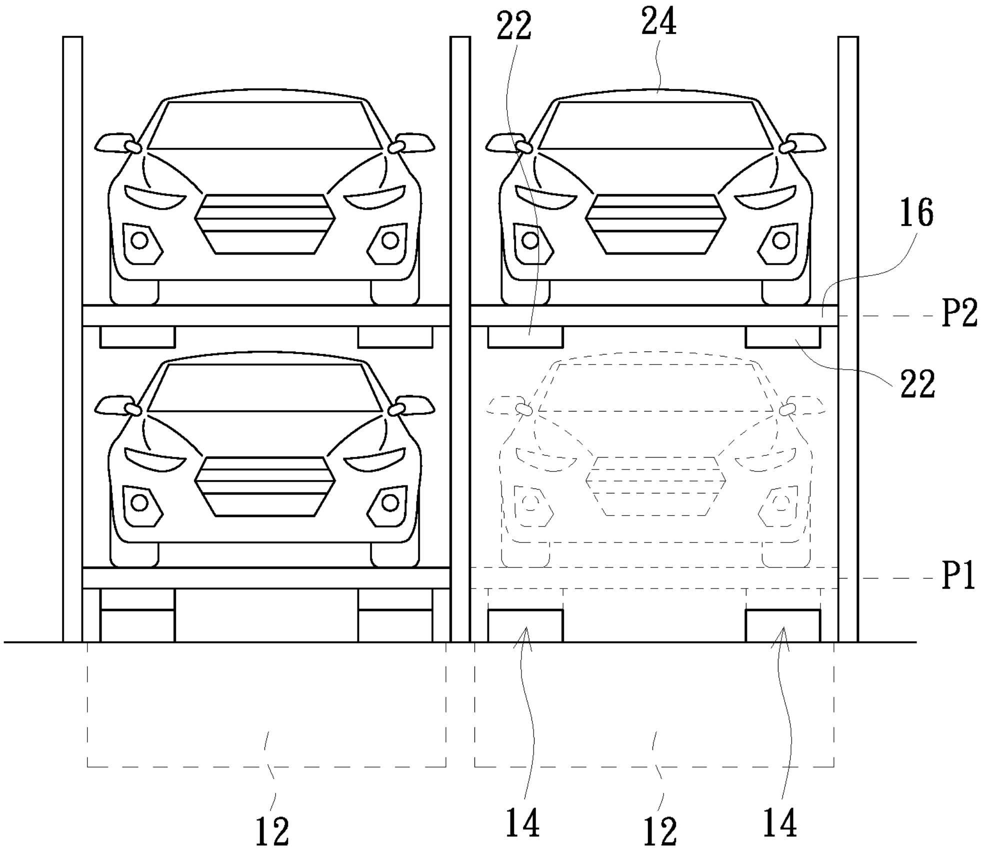
FIG. 2 is a schematic front view of a mobile charging device applied to a vehicle according to an embodiment of the present invention.

FIG. 1 is a schematic perspective view of a mobile charging device according to an embodiment of the present invention. FIG. 2 is a schematic front view of a mobile charging device applied to a vehicle according to an embodiment of the present invention. As shown in FIG. 1, the mobile charging device 10 includes a charging host 12, charging plates 14, a mobile parking plate 16 and a charging gun 18. The charging host 12 is adapted to provide electricity, the charging host 12 includes, for example, one first electrode block 121 and one second electrode block 122, and the first electrode block 121 and the second electrode block 122 are different in electrical properties. The number of the charging plates 14 is, for example, two, and the two charging plates correspond to and are in contact with the first electrode block 121 and the second electrode block 122, respectively. The mobile parking plate 16 includes a parking plate body 20 and conductive contact blocks 22, the parking plate body 20 has a first surface 201 and a second surface 202 that are opposite to each other, the first surface 201 is adapted to park a vehicle 24 (shown in FIG. 2), the number of the conductive contact blocks 22 is, for example, two, and the two conductive contact blocks 22 are disposed on the second surface 202 and correspond to the two charging plates 14, respectively. The charging gun 18 is disposed on the parking plate body 20 and electrically connected with the conductive contact blocks 22. In one embodiment, the charging gun 18 is erected on a first surface 201 of the parking plate body 20.

Further to the above description, as shown in FIG. 2, the mobile parking plate 16 is adapted to move relative to the charging host 12 to be in one of a first position P1 and a second position P2. Which of first position P1 and the second position P2 serves as the position where the mobile parking plate 16 is located may be defined, for example, by whether the conductive contact blocks 22 of the mobile parking plate 16 are in contact with the charging plate 14 or not. In an embodiment, as shown in FIG. 2, the first position P1 is below the second position P2, and the mobile parking plate 16 is adapted to ascend and descend to be in one of the first position P1 and the second position P2.

Figure 3:
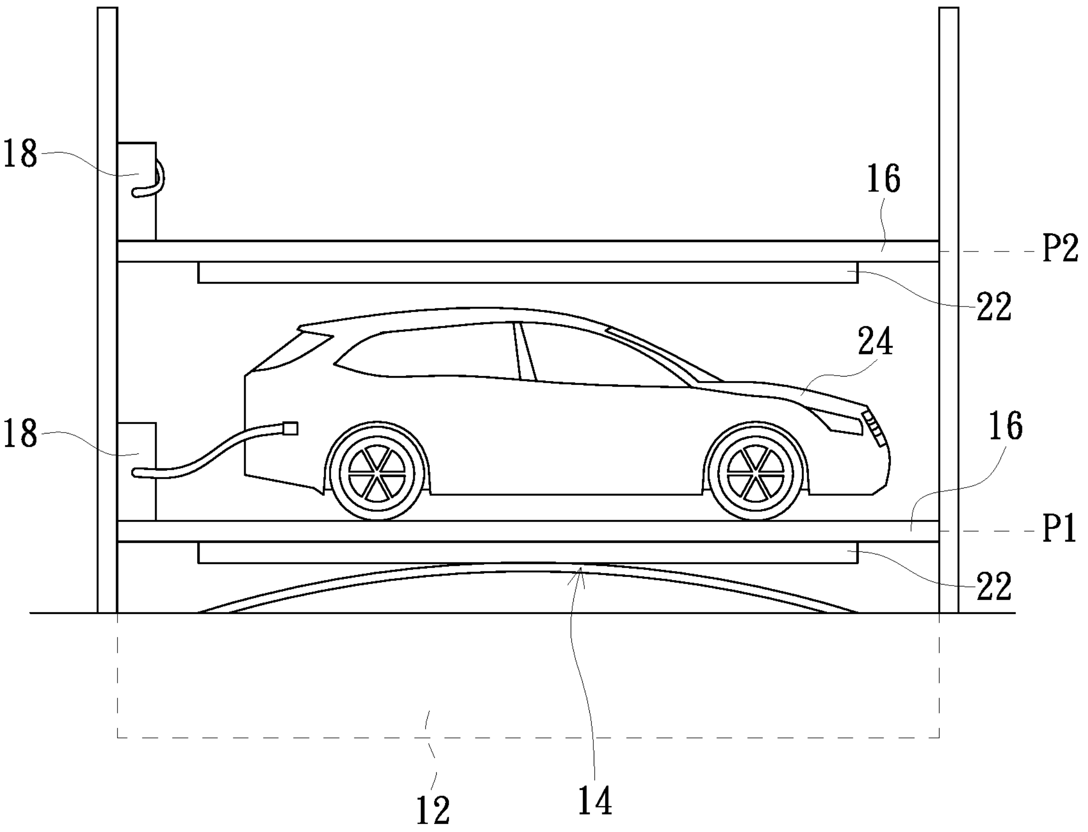
FIG. 3 is a schematic side view of a mobile charging device for charging a vehicle according to an embodiment of the present invention.

Further to the above description, FIG. 3 is a schematic side view of a mobile charging device for charging a vehicle according to an embodiment of the present invention. With reference to FIG. 2 and FIG. 3 at the same time, when the mobile parking plate 16 is in the first position P1, the two conductive contact blocks 22 of the mobile parking plate 16 are in contact with the two charging plates 14, respectively, then the charging gun 18, the two conductive contact blocks 22, the two charging plates 14 and the charging host 12 that are disposed on the parking plate body 20 are conducted with each other, and the electricity provided by the charging host 12 is adapted to charge the vehicle 24 parked on the parking plate body 20 through the charging gun 18. When the mobile parking plate 16 is in the second position P2, the two conductive contact blocks 22 get away from the two charging plates 14, respectively, and a power conduction loop of the mobile charging device 10 is interrupted.

With reference to FIG. 1 again, guide rails 123 are respectively formed on the first electrode block 121 and the second electrode block 122 that are disposed on the charging host 12, and the two charging plates 14 are respectively disposed on the guide rails 123. In an embodiment, each charging plate 14 includes an arcuate body part 141 and two connecting parts 142, the two connecting parts 142 are respectively disposed at two opposite ends of the arcuate body part 141, the two connecting parts 142 are slidably disposed on the guide rail 123, and the arcuate body part 141 protrudes from the guide rail 123. As shown in FIG. 3, when the mobile parking plate 16 is in the first position P1, the two conductive contact blocks 22 press down the arcuate body parts 141 of the two charging plates 14, respectively, and the two connecting parts 142 get away from each other along the guide rail 123, as shown by an arrow direction 26 in FIG. 1, so as to reduce heights, or curvatures of curved surfaces, of the arcuate body parts 141. With the arrangement of the guide rail 123, it is adapted to provide a buffer space when the height or the curvature of the curved surface of the arcuate body part 141 of the charging plate 14 is reduced due to pressure. The greater an area or the curvature of the curved surface of the arcuate body part 141 of the charging plate 14 is, the greater the electric electricity provided by the charging host 12 is.

The mobile charging device according to an embodiment of the present invention is adapted to be applied in a mechanical parking space or a multistory parking garage, wherein the mobile parking plate 16 may cooperate with an existing vehicle plate elevator of the mechanical parking space or the multistory parking garage, so that the mobile parking plate 16 can cooperate with a control system of the mechanical parking space or the multistory parking garage to move. Furthermore, in an embodiment, the charging host 12 may be disposed under the ground below the corresponding mechanical parking space, and only two charging plates 14 protrude from the ground to be in contact the two conductive contact blocks 22, respectively. However, according to the design of the mechanical parking space or a three-dimensional parking space, a moving mode of a parking space elevator is not limited to vertical lifting, but may also include left-right movement, so that the mobile parking plate 16 can also move horizontally in cooperation with the mechanical elevator to be in the first position P1 or other positions.

Figure 4:
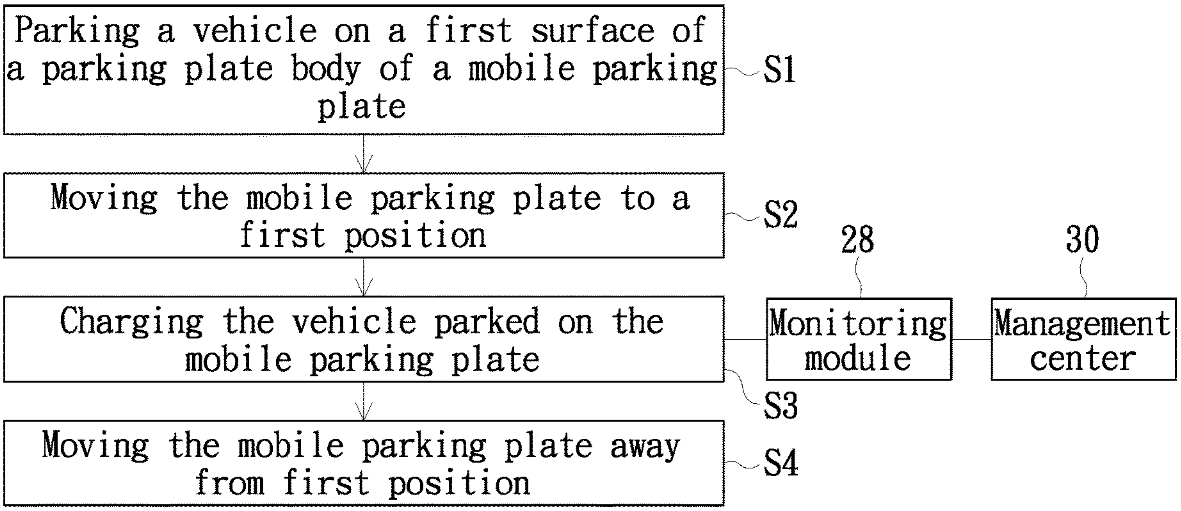
FIG. 4 is a flow diagram of a charging method according to an embodiment of the present invention.

FIG. 4 is a schematic flow diagram of a charging method according to an embodiment of the present invention, wherein the charging method is used in conjunction with the mobile charging device 10 (as shown in FIG. 1) according to the embodiment of the present invention, and the structure and configuration of the mobile charging device 10 have been previously disclosed, the details of which are omitted here. As shown in FIG. 1 to FIG. 4, the charging method according to the embodiment of the present invention includes: driving, by a user, a vehicle 24 onto the first surface 201 of the parking plate body 20, which is step S1. Next, the mobile parking plate 16 with the vehicle 24 parked is controlled to move to the first position P1, which is step S2, so that the two conductive contact blocks 22 of the mobile parking plate 16 are in contact with the two charging plates 14, respectively, and the charging gun 18, the two conductive contact blocks 22, the two charging plates 14 and the charging host 12 are conducted with each other. Next, the vehicle 24 parked on the mobile parking plate 16 is charged by the electricity provided by the charging host 12 through the charging gun 18, which is step S3. Finally, after the charging of the vehicle 24 is completed, the mobile parking plate 16 on which the vehicle 24 is parked is controlled by a management center 30 of a parking lot to move away from the first position P1, which is step S4.

In an embodiment, in a charging process, a monitoring module 28 may be used to monitor a charging state of the vehicle 24 on the mobile parking plate 16, the monitoring module 28 is suitable for connecting online with the management center 30 of the mechanical parking space or the multistory parking garage, and when the charging of the vehicle 24 is completed, the monitoring module 28 transmits a message back to inform the management center 30 of the parking lot, and the management center 30 controls the mobile parking plate 16 on which the vehicle 24 is parked to get away from the first position.

According to the described above, the mobile charging device of the embodiment of the present invention adopts the movable characteristic of the mobile parking plate, so that the conductive contact blocks may be moved to be in contact with the charging plates to form a conductive circuit loop, and the electricity provided by the charging host can charge the vehicle parked on the mobile parking plate through the charging gun on the mobile parking plate; when the charging of the vehicle is completed, the mobile parking plate and the charged vehicle may be moved away from the charging plates with the help of the movement of the mobile parking plate, so that another vehicle parked on another mobile parking plate and waiting for charging may be moved to the charging plates with the help of mobile parking plate on which the another vehicle is parked, and the charging gun on the mobile parking plate on which the another vehicle is parked is allowed to be in a power-on state to charge the vehicle. The mobile charging device and the charging method according to the embodiment of the present invention can greatly shorten the waiting time for users to queue up for charging, and also improve the use efficiency of the automatic automobile charging device.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mobile charging device adapted to charge a vehicle, the mobile charging device comprising:

- a charging host, comprising at least one first electrode block and at least one second electrode block, wherein the at least one first electrode block and the at least one second electrode block have different electrical properties, and the charging host is adapted to provide electricity;
- at least two charging plates, respectively corresponding to and being in contact with the at least one first electrode block and the at least one second electrode block;
- a mobile parking plate, comprising a parking plate body and at least two conductive contact blocks, wherein the parking plate body has a first surface and a second surface that are opposite to each other, the first surface is adapted to park the vehicle, the at least two conductive contact blocks are disposed on the second surface, and the mobile parking plate is adapted to move relative to the charging host to be in one of a first position and a second position, wherein the at least two conductive contact blocks are respectively in contact with the at least two charging plates when the mobile parking plate is in the first position, and the at least two conductive contact blocks respectively get away from the at least two charging plates when the mobile parking plate is in the second position; and
- a charging gun, disposed on the parking plate body and electrically connected with the at least two conductive contact blocks, wherein when the mobile parking plate is in the first position, the charging gun, the at least two conductive contact blocks, the at least two charging plates and the charging host are conducted with each other, and the electricity provided by the charging host is adapted to charge the vehicle parked on the parking plate body through the charging gun.

2. The mobile charging device according to claim 1, wherein the first position is below the second position, and the mobile parking plate is adapted to ascend and descend to be in one of the first position and the second position.

3. The mobile charging device according to claim 1, wherein a guide rail is formed on each of the at least one first electrode block and the at least one second electrode block, each of the at least two charging plates comprises an arcuate body part and two connecting parts, the two connecting parts are respectively disposed at two opposite ends of the arcuate body part, the two connecting parts of each of the at least two charging plates are adapted to be disposed on the guide rail in a sliding manner, and the arcuate body part protrudes from the guide rail.

4. The mobile charging device according to claim 3, wherein when the mobile parking plate is in the first position, the at least two conductive contact blocks press down the arcuate body parts of the at least two charging plates, respectively, and the two connecting parts get far away from each other along the guide rail.

5. The mobile charging device according to claim 3, wherein the greater an area of the arcuate body part or a curvature of a curved surface of the arcuate body part is, the greater electric power of the electricity provided by the charging host is.

6. The mobile charging device according to claim 1, wherein the charging host is disposed under the ground, and only the charging plate protrudes from the ground.

7. A charging method adapted to charge a vehicle, the charging method comprising:

providing a mobile charging device comprising:

- a charging host, comprising at least one first electrode block and at least one second electrode block, wherein the at least one first electrode block and the at least one second electrode block have different electrical properties, and the charging host is adapted to provide electricity;
- at least two charging plates, respectively corresponding to and being in contact with the at least one first electrode block and the at least one second electrode block;
- a mobile parking plate, comprising a parking plate body and at least two conductive contact blocks, wherein the parking plate body has a first surface and a second surface that are opposite to each other, the first surface is adapted to park the vehicle, the at least two conductive contact blocks are disposed on the second surface, and the mobile parking plate is adapted to move relative to the charging host to be in one of a first position and a second position, wherein the at least two conductive contact blocks are respectively in contact with the at least two charging plates when the mobile parking plate is in the first position, and the at least two conductive contact blocks respectively get away from the at least two charging plates when the mobile parking plate is in the second position; and a charging gun, disposed on the parking plate body and electrically connected with the at least two conductive contact blocks; and driving the vehicle onto the first surface of the parking plate body;

controlling the mobile parking plate with the vehicle parked to move to the first position, so that at least two conductive contact blocks of the mobile parking plate are in contact with the at least two charging plates, respectively, the charging gun, the at least two conductive contact blocks, the at least two charging plates and the charging host are conducted with each other, and the electricity provided by the charging host charges the vehicle parked on the parking plate body through the charging gun; and when the charging of the vehicle is completed, controlling the mobile parking plate to move away from the first position.

8. The charging method according to claim 7, wherein during a charging process of the vehicle, the charging process of the vehicle is monitored by a monitoring module, and when the charging of the vehicle is completed, the monitoring module transmits a message back.

* * * * *